2 Sheets—Sheet 1.

O. B. LATHAM.
RAILWAY-RAIL JOINT.

No. 172,037. Patented Jan. 11, 1876.

Witnesses:
Edw. W. Dunn
M. Gardner

Inventor:
Obadiah P. Latham
By W. C. Dunn
His Attorney.

UNITED STATES PATENT OFFICE.

OBADIAH B. LATHAM, OF SENECA FALLS, NEW YORK.

IMPROVEMENT IN RAILWAY-RAIL JOINTS.

Specification forming part of Letters Patent No. 172,037, dated January 11, 1876; application filed June 8, 1875.

*To all whom it may concern:*

Be it known that I, OBADIAH B. LATHAM, of Seneca Falls, in the county of Seneca and State of New York, have invented certain new and useful Improvements in Railway Fish-Joints; and I do hereby declare the following to be a full, clear, and exact description of the invention, such as will enable others skilled in the art to which it pertains to make and use it, reference being had to the accompanying drawings, which form part of this specification.

My invention relates to an improvement in railway fish-joints, the objects of which are to give greater strength and efficiency to the connection of the rails by preventing the bolts and nuts loosening from the jarring and friction to which they are subjected, and to render them capable of being tightened through the automatic action of the nut.

The invention consists substantially in securing together the ends of the rails by fish-plates attached thereto by square bolts passed through rectangular holes in the rails, and square holes in the fish-plates, said bolts being held in place by gravitating nuts, so located with respect to the bolts that they screw or tighten themselves thereon automatically by the jarring and friction to which they are exposed, and which, in connection with the peculiar form of the bolt-holes and bolts, prevent the latter from turning or becoming loose in their places.

Figure 1:
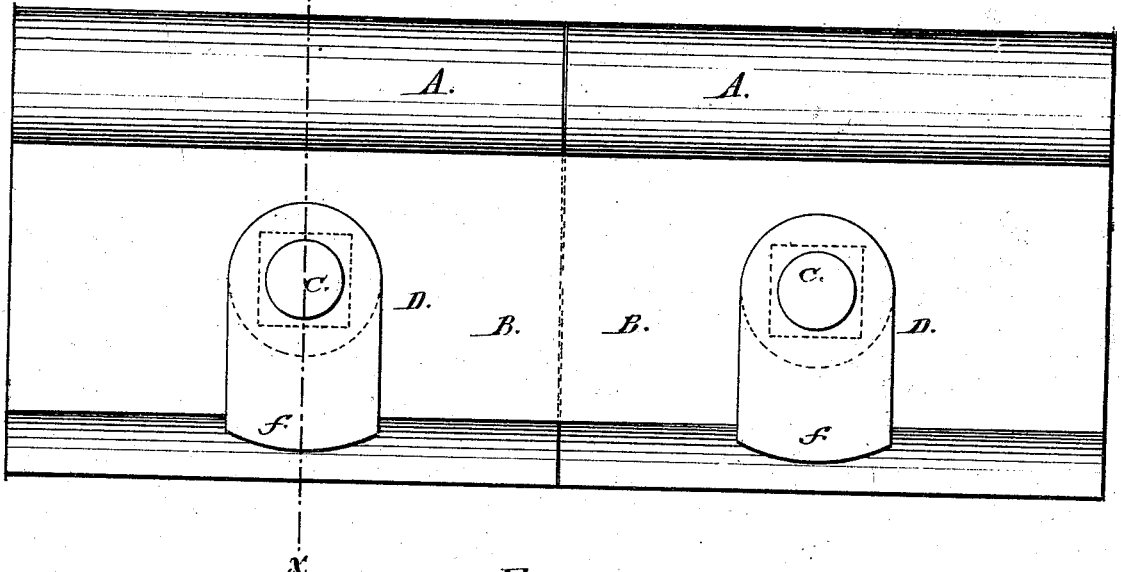
Figure 2:
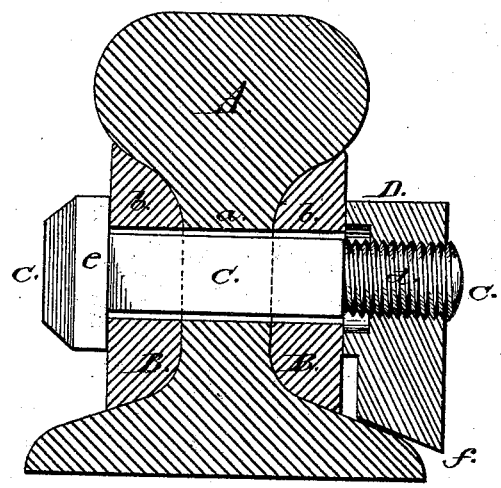
Figure 4:
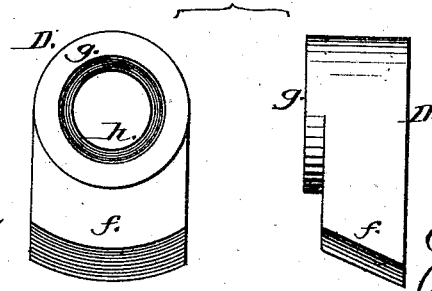
Figure 3:
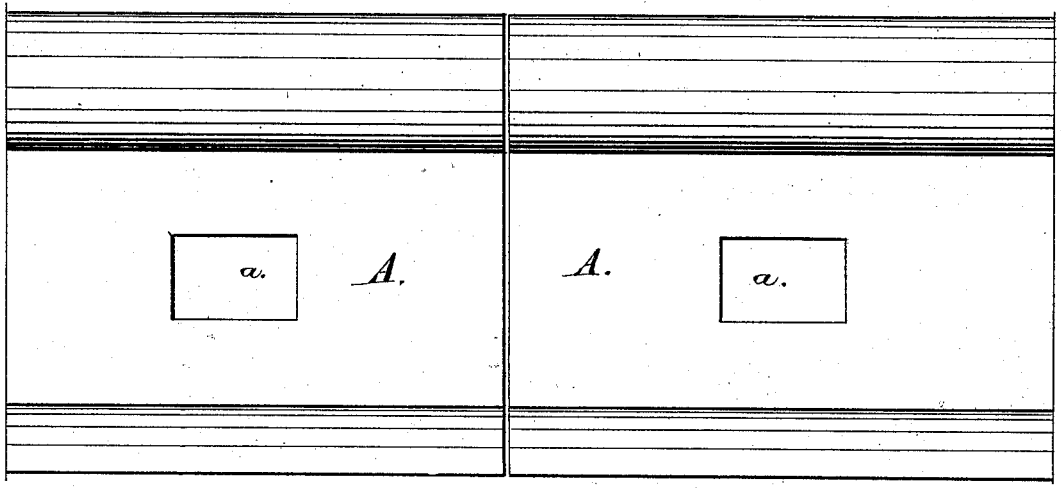

Figure 1 is a side elevation of the fish-joint. Fig. 2 is a vertical section through line $x\ x$, Fig. 1. Fig. 3 is a side elevation, showing the rectangular holes in the rail. Fig. 4 shows the gravitating nut with rectangular annular groove therein.

Referring to the drawings, A A represent two railroad-rails joined together by the fish-plates B B. Through the rails are made the rectangular bolt-holes $a\ a$, and through the plates the square holes $b\ b$. The bolt C has a square shank, $c$, extending through both plates when affixed to the rail, but finished with the thread $d$. The dimensions of the shank $c$ are such that it will fit in the holes $b\ b$ of the plates B B sufficiently close to be prevented from turning by the movement of the rail A A in contact at the rectangular hole $a$ in the same. The head $e$ is square, with beveled edges, so as to clear them of the flanges of the wheels. D is the gravitating nut, having weighted extensions $f$ with circular shoulder $g$, and rectangular annular groove $h$, and when screwed on the thread $d$ will tighten the plates B B to the rails A A by allowing the square shank $c$ to pass into the annular groove $h$ in the gravitating nut D.

The various bolts now used to secure fish-plates to railroad-rails are round, and about three-fourths (¾) of an inch diameter, while the holes provided for them in the ends of the rails are elongated horizontally about one-fourth (¼) of an inch more than the diameter of the bolt, in order to give the rail space for contraction and expansion. There are longitudinal movements of the rail from various causes, such, for instance, as from the momentum of the engine and cars, by the friction of their wheels on the track when the brakes are applied, the starting of the train, its movements or curves, and inclinations, &c. This longitudinal movement given to the rail has the effect of turning or rolling the circular bolt by coming in contact with the rail at the elongated hole therein, and gradually causes them to work loose in the nut, and, vice versa, the nut to work loose on the bolt, and, finally, the nut to work off the bolt, and the bolt to work entirely out of its place. Heretofore, to prevent this, some peculiarity of form has been given to the head of the bolt; but, owing to the fact that the nut itself was liable to become loose, and allow the bolt to work out, the various devices have proved of but little avail to accomplish the object intended. In addition to these defects the head of the bolt, generally made T-shaped, lying horizontally, or with a rivet-head, is of but little use in supporting the fish-plate in a vertical position, as intended, and consequently they are liable to get out of this position. Now, these various defects it is the object of my invention to overcome, and this is done by the use of several devices and peculiarities of construction, old in themselves, but in their present connection and combination new and of great utility.

The first of these, it will be observed, is the square bolt, which is much stronger than a round bolt of the like size, and, furthermore, the holes provided for them do not weaken the fish-plates or rails any more. This bolt I use in connection with the rectangular bolt-holes in the rails.

It is obvious that no matter how much movement there may be of the rails this bolt can never be turned or rolled, but must always maintain the position in which it is placed. The bolt-head is about one and a half (1½) inches square, with beveled edges to avoid the flanges of the wheels, and bears squarely against the fish-plates, and, as it is incapable of any movement, maintains the plate in its vertical position. Lastly, I use in connection with the square bolt a gravitating nut, with circular shoulder and an annular groove therein, into which the square shank of the bolt is drawn when fastening the fish-plates to the rails by screwing on the said nut, which is located in such a position with respect to the bolt that the jarring and friction to which it is subjected only tend to cause the nut to become tighter on the bolt, and make it impossible for it to work off or get loose.

Having thus described my invention, what I claim to be new, and desire to secure by Letters Patent, is—

A fish-joint for railroads, composed of the following parts in combination: the square bolt C, having a square head, e, the square holes b b in the fish-plates, the rectangular holes a in the rails, and the gravitating nut D, when constructed, arranged, and combined in the manner substantially as hereinbefore described and set forth.

In testimony that I claim the foregoing I have hereunto set my hand this 31st day of May, 1875.

OBADIAH B. LATHAM.

Witnesses:
 J. L. HALEY,
 G. E. BRAINARD.